| United States Patent [19] | [11] | 4,092,288 |
|---|---|---|
| Calkins et al. | [45] | May 30, 1978 |

[54] STABILIZED POLYCARBONATE RESIN

[75] Inventors: Thornton Ross Calkins, Pittsfield, Mass.; Donald Benjamin George Jaquiss, New Harmony, Ind.

[73] Assignee: General Electric Company, Pittsfield, Mass.

[21] Appl. No.: 707,619

[22] Filed: Jul. 22, 1976

Related U.S. Application Data

[63] Continuation of Ser. No. 520,659, Nov. 4, 1974, abandoned, which is a continuation-in-part of Ser. No. 320,638, Jan. 2, 1973, abandoned, which is a continuation-in-part of Ser. No. 103,870, Jan. 1, 1971, abandoned.

[51] Int. Cl.² .............................................. C08L 69/00
[52] U.S. Cl. ......................... 260/37 PC; 260/45.7 P; 260/45.8 A
[58] Field of Search ...................... 260/37 PC, 45.7 P

[56] References Cited

U.S. PATENT DOCUMENTS

| 3,314,920 | 4/1967 | Sakurai et al. ...................... 260/75 P |
| 3,398,212 | 8/1968 | Jackson, Jr. et al. .......... 260/45.95 R |
| 3,498,946 | 3/1970 | Calkins ............................. 260/37 PC |
| 3,676,393 | 7/1972 | Piirma .............................. 260/45.7 P |

*Primary Examiner*—Lewis T. Jacobs
*Attorney, Agent, or Firm*—Salvatore C. Mitri; William F. Mufatti

[57] ABSTRACT

An aromatic polycarbonate composition that is color stable, which composition consists of an aromatic polycarbonate resin having in admixture therewith 0.005 – 0.5 weight percent of a phosphine and with or without an epoxy compound and a pigment.

4 Claims, No Drawings

STABILIZED POLYCARBONATE RESIN

This application is a continuation of application Ser. No. 520,659, filed Nov. 4, 1974, now abandoned, which in turn is a continuation-in-part of application Ser. No. 320,638, filed Jan. 2, 1973, now abandoned which in turn is a continuation-in-part of application Ser. No. 103,870, filed Jan. 1, 1971 now abandoned.

This invention is directed to a color stable aromatic polycarbonate resin composition and in particular an aromatic polycarbonate resin composition containing therein a particular phosphine and with or without an epoxy compound.

BACKGROUND OF THE INVENTION

In the art, many thermoplastic polymers require stabilization upon exposure to high temperatures since a polymer per se is not generally stable against discoloration or degradation when exposed to elevated temperatures. Certain additives have been found that are suitable for stabilizing thermoplastic polymers when exposed to elevated temperatures. Particularly useful are certain phosphites which have been disclosed as stabilizing thermoplastic polymers and in particular the case of aromatic polycarbonate resins as set forth in U.S. Pat. No. 3,305,520. The particular phosphites were found to be suitable for stabilizing clear polycarbonate resins against discoloration due to heat aging. In addition to phosphites, other materials in combination with phosphites such as tetraaryl tin compounds disclosed by Canadian Pat. No. 727,700 have also been useful.

DESCRIPTION OF THE INVENTION

It has now been surprisingly discovered that a color and heat stable aromatic polycarbonate composition can be attained by incorporating with an aromatic polycarbonate, a particular phosphine which may have in combination therewith an epoxy or a pigment. Specifically, the composition comprises an aromatic polycarbonate resin having in admixture 0.005 – 0.5 weight percent of a phosphine with or without 0.01 – 1.0 weight percent of an epoxy compound based on the weight of the polycarbonate. It has been found that by employing the combination of additives in admixture with an aromatic polycarbonate, the aromatic polycarbonate has excellent stability to discoloration at elevated temperatures. For example, the polycarbonate resin does not discolor in the presence of titanium dioxide when the resin is molded into useful shapes or exposed to elevated temperatures. The phosphine employed herein may be either a triaryl, a trialkyl, a tri(alkyl-aryl) or an alkyl-aryl phosphine or mixtures thereof.

PREFERRED EMBODIMENT OF THE INVENTION

The following examples are set forth to illustrate more clearly the principle and practice of this invention to those skilled in the art. Unless otherwise specified, where parts or percents are mentioned, they are parts or percents by weight.

EXAMPLE I

A polycarbonate resin is prepared by reacting equimolar amounts of 2,2-bis(4-hydroxyphenyl) propane (hereinafter referred to as bisphenol-A) and phosgene, which preparation and polymer are disclosed in U.S. Pat. No. 3,028,365. The polycarbonate resin so prepared has an intrinsic viscosity of 0.50 as measured in dioxane at 30° C. The polycarbonate resin so prepared is blended with the various additives so indicated in Table 1 in a laboratory mixer, dried at 250° F, and extruded into a strand which is comminuted into pellets. The pellets are then injection molded at 600° F into test discs 2 inches in diameter by one-eighth inch thick, and tested for yellowness in accordance with ASTM Yellowness Index Test D-1925-63T. The melt viscosity of the resin is also determined.

The amount of the additives employed with the polycarbonate resin as disclosed in Table 1 is based on the weight of the polycarbonate resin. The test discs are tested for yellowness as molded and after heat aging for 7 days at 140° C. In each case, the Yellowness Test is run at room temperature. Melt viscosities are determined by heating the pellets to 600° F for 20 minutes. The results are as follows:

TABLE 1

| | Molding Temperatures | | Yellowness Index Heat aged 7 days at 140° C | | Melt Viscosities (poises) |
|---|---|---|---|---|---|
| | 600° F | 680° F | 600° F | 680° F | |
| 0.05% triphenyl phosphine | 1.6 | 2.5 | 5.7 | 6.4 | 3350 |
| 0.05% trioctyl phosphine | 2.5 | 3.3 | 7.0 | 10.1 | 2960 |
| Control (no phosphine) | 3.6 | 4.6 | 7.7 | 10.6 | 3210 |

EXAMPLE II

Example I is repeated except that 0.05 weight percent of an epoxy* compound is employed with triphenyl phosphines and the polycarbonate has an intrinsic viscosity of 0.59. The results are as follows:

TABLE 2

| | Yellowness Index | | Melt Viscosities (poises) |
|---|---|---|---|
| | 600° F | Heat Aged 7 days at 140° C | |
| 0.02% triphenyl phosphine | 3.8 | 5.4 | 6290 |
| 0.06% triphenyl phosphine | 3.8 | 4.6 | 6600 |
| Control (no phosphine but with epoxy) | 4.5 | 6.0 | 5880 |

* Epoxy compound: 3,4-epoxy cyclohexylmethyl 3,4-epoxy cyclohexane carboxylate.

EXAMPLE III

Example I is repeated except that 1 weight percent of titanium dioxide (TiO$_2$) pigment is employed herein along with various phosphines as listed in Table 3. The results are as follows:

TABLE 3

| | Yellowness Index | | Melt Viscosities (poises) |
|---|---|---|---|
| | 600° F | Heat Aged 7 days at 140° C | |
| 0.05% triphenyl phosphine | 8.8 | 13.9 | 2330 |
| 0.10% triphenyl phosphine | 8.7 | 11.9 | 2290 |
| 0.05% trioctyl phosphine | 8.9 | 13.6 | 2450 |
| 0.5% tri (p-chlorophenyl) phosphine | 11.0 | 15.4 | 2310 |
| Control (no phosphine) | 12.9 | 17.0 | 2520 |

The Yellowness Index number is an indication of discoloration of the polycarbonate due to yellowness. The lower the number, the less is the yellowness of the polycarbonate resin due to discoloration. As shown from the examples, the use of the phosphines greatly reduces the yellowness of the polycarbonate resin as molded and after aging for 7 days at 140° C. Further, as shown in the examples, the melt viscosity of a polycarbonate resin is not greatly affected by the addition of the phosphine and pigment or epoxy. The use of epoxy greatly aids in maintaining melt viscosity of the polycarbonate. Melt viscosity is important since a substantial reduction in melt viscosity results in a reduction in properties of the polycarbonate. Therefore, it is important and necessary to maintain melt viscosities as close to the unmodified polycarbonate as possible. It is often found that the use of additives greatly reduces the melt viscosity of a polycarbonate. In the practice of this invention, the use of the epoxy with the phosphine enhances the stability of the melt viscosity of the polycarbonate.

The instant invention is directed to a thermally stable aromatic polycarbonate composition, which composition comprises a polycarbonate resin having in admixture therewith (a) 0.005 – 0.5 weight percent of a phosphine or (b) a mixture of 0.005 – 0.5 weight percent of a phosphine and 0.01 – 1.0 weight percent of an epoxy compound. Additionally, the composition of the instant invention may have incorporated therewith a color pigment. As shown in the examples, the phosphines herein disclosed are excellent stabilizers of either pigmented or unpigmented polycarbonate resins against discoloration when exposed to elevated temperatures. The weight percents set forth above are all based on the weight of the polycarbonate resin. In addition, the compositions disclosed herein are also resistant to degradation as shown by the melt viscosity in the examples. The addition of phosphine with or without the epoxy greatly enhances the stability of the melt viscosity of the polycarbonate, which melt viscosity would have been otherwise reduced by the addition of a pigment alone.

The pigments employed in the practice of this invention are generally any of the pigments which are commonly used for coloring thermoplastic polymers. However, particularly useful in the practice of this invention are the metal oxide pigments which are known in the art and which are able to withstand temperatures in excess of 200° C. Such metal oxides include titanium dioxide, zinc oxide, lead oxide, lead chromate, etc. Generally, the pigments should be in the form of a finely divided powder to insure complete dispersion in the polycarbonate. In addition to the metal oxide pigment, other colorants either organic or inorganic may be added to the polycarbonate composition in order to obtain any desired coloration. Suitable colorants include nickel titanium yellow, cadmium-sulfo-selenide, strontium chromate, phthalocyanine, carbon black, naphthol red, ultramarine blue, benzidene yellow, etc.

The manner of dispersing or mixing the pigment, epoxy and phosphine with the polycarbonate is not critical. However, the process chosen should be one which results in a great degree of dispersion of all the additives uniformly throughout the polycarbonate resin. Mixing of the material, for example, may be accomplished by methods normally employed for incorporation of materials such as fillers and modifiers, etc., in any thermoplastic polymer. These methods include, for example, mixing rolls, ribbon blenders, dough mixers, Banbury mixers, extruders and other mixing equipment. The mixtures can then be formed or molded using compression molding, injection molding, calendering, or extrusion techniques. Generally, it is preferred to pre-blend the aromatic polycarbonate resin with additives in a blender. The mix is then fed to an extruder and extruded into a strand which is then comminuted into pellets. The pellets may then be employed for either compression molding, injection molding, etc.

In general, any aromatic polycarbonate resin can be employed herein. Generally, the aromatic polycarbonates employed herein are polymers of dihydric phenols. The dihydric phenols that can be employed herein are bisphenols such as bis(4-hydroxyphenyl) methane, 2,2-bis(4-hydroxyphenyl) propane, 2,2-bis(4-hydroxy-3-methylphenyl) propane, 4,4-bis(4-hydroxyphenyl) heptane, etc., dihydric phenol ethers such as bis(4-hydroxyphenyl) ether, bis(3,5-dichloro-4-hydroxyphenyl) ether, etc., dihydroxydiphenyls such as p,p'-dihydroxydiphenyl, 3,3'-dichloro-4,4'-dihydroxydiphenyl, etc., dihydroxyaryl sulfones such as bis(4-hydroxyphenyl) sulfone, bis(3,5-dimethyl-4-hydroxyphenyl) sulfone, bis(3-methyl-5-ethyl-4-hydroxyphenyl) sulfone, etc., dihydroxy benzenes, resorcinol, hydroquinone, halo- and alkyl-substituted dihydroxy benzenes such as 1,4-dihydroxy-2-chlorobenzene, 1,4-dihydroxy-2,3-dichlorobenzene, 1,4-dihydroxy-3-methylbenzene, etc., and dihydroxy diphenyl sulfoxides such as bis(4-hydroxyphenyl) sulfoxide, bis(3,5-dibromo-4-hydroxyphenyl) sulfoxide, etc. A variety of additional dihydric phenols are also available to provide carbonate polymers and are disclosed in U.S. Pat. Nos. 2.999,835 and 3,028,365. It is, of course, possible to employ two or more different dihydric phenols or a copolymer of a dihydric phenol with glycol, a hydroxy or an acid terminated polyester, or a dibasic acid in the event a carbonate copolymer or interpolymer rather than a homopolymer is desired for use in the preparation of the aromatic carbonate polymers of this invention.

Generally the polycarbonate employed herein may be prepared by reacting a dihydric phenol with a carbonate precursor in the presence of a molecular weight regulator and an acid acceptor. The carbonate precursors that can be used herein are either a carbonyl halide, a carbonate ester or a haloformate. The carbonyl halides which can employed herein are carbonyl bromide, carbonyl chloride, carbonyl fluoride, etc., or mixtures thereof. Typical of the carbonate esters which may be employed herein are diphenyl carbonate, di-(halophenyl) carbonates such as di-(chlorophenyl) carbonate, di(bromophenyl) carbonate, di(trichlorophenyl) carbonate, di-(tribromophenyl) carbonate, etc., di-(alkylphenyl) carbonates such as di-(tolyl) carbonate, etc., di-(naphthyl) carbonate, di-(chloronaphthyl) carbonate, phenyl tolyl carbonate, chlorophenyl chloronaphthyl carbonate, etc., or mixtures thereof. The haloformates suitable for use herein include bishaloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene is preferred.

As stated previously, the reaction may be carried out in the presence of an acid acceptor, which acid acceptor may be either an organic or an inorganic compound. A suitable organic acid acceptor is a tertiary amine and includes such materials as pyridine, triethylamine, dimethylaniline, tributylamine, etc. The inorganic acid acceptor may be one which can either be an hydroxide, a carbonate, a bicarbonate or a phosphate of an alkali or alkaline earth metal.

The molecular weight regulators which may also be employed in carrying out the process for preparing the aromatic polycarbonate resins can be such molecular weight regulators as phenol, cyclohexanol, methanol, paratertiarybutylphenol, parabromophenol, etc.

The phosphines that can be employed in the practice of this invention can be any of the triaryl, trialkyl, tri(alkyl-aryl), or alkyl aryl phosphines or mixtures thereof. Examples of phosphines which are particularly useful and which can be used in place of the phosphines disclosed in the examples with essentially the same results are triaryl phosphine, triethyl phosphine, tributyl phosphine, tripropyl phosphine, triamyl phosphine, dimethyl phenyl phosphine, diphenyl methyl phosphine, diphenyl octyl phosphine, dibutyl phenyl phosphine and tri (butyl phenyl) phosphine. Preferably, the phosphine employed in the practice of this invention is triphenyl phosphine.

In addition, as set forth previously, the epoxy composition employed herein may be selected from the groups consisting of compositions represented by the following formula:

I. Derivatives of epoxy ethane represented by the following formula:

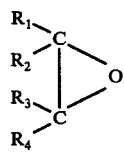

wherein $R_1$, $R_2$, $R_3$, and $R_4$ are independently selected from the group consisting of hydrogen, an alkyl radical of 1 – 24 carbon atoms, an aryl radical of 6–24 carbon atoms, —CH$_2$OR', —CH$_2$OCOR', —CH$_2$OCOR"λ COOCH$_2$X, CH$_2$OR"OCH$_2$X wherein R' is selected from the group consisting of an alkyl radical of 1–24 carbon atoms or an aryl radical of 6 to 24 carbon atoms and wherein R" is an alkylene radical of 1–24 carbon atoms and X is an oxirane ring.

II. Derivatives of epoxy cyclohexane represented by the following formula:

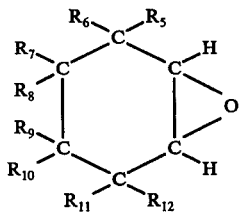

wherein $R_5$ through $R_{12}$ are independently selected from the group consisting of hydrogen, alkyl radicals of 1–24 carbon atoms, —COOR$_{13}$, —OCOR$_{13}$, —COOR$_{14}$X, —OCOR$_{14}$-COOX wherein $R_{13}$ is an alkyl radical of 1–24 carbon atoms and $R_{14}$ therein is an alkylene radical of 1–24 carbon atoms and X is an oxirane ring.

While the actual number of hydrogen atoms employed may vary, it should be a function of the volatility of the epoxy compound. The number of hydrogen atoms should be such as to minimize the volatility of the epoxy compound since if the epoxy compound were to volatize at a low temperature, its benefit in use with a polycarbonate would be lost at the molding temperatures employed in preparing molded articles from the composition of this invention.

The amount of epoxy employed in the practice of this invention can vary from 0.01 to 0.5 weight percent based on the weight of the polymer composition and is preferably 0.03 to 0.1 weight percent. While more than 0.5 weight percent of epoxy can be employed, it has been found that higher amounts tend to degrade the physical properties of the polycarbonate and thereby reduce the usefulness of the polymer in providing tough, flexible, molded articles.

In the practice of this invention, other epoxy compounds that have been employed in place of the 3,4-epoxy-cyclohexylmethyl 3,4-epoxy cyclohexane carboxylate with essentially the same results as those set forth previously as encompassed by the formula I and II and are 3,4-epoxy-6-methylcyclohexylmethyl, 3,4-epoxy-6-methylcyclohexane carboxylate, 2,3-epoxycyclohexylmethyl 3,4-epoxycyclohexane carboxylate, 4-(3,4-epoxy-5-methylcyclohexyl) butyl 3,4-epoxycyclohexane carboxylate, 3,4-epoxycyclohexyl ethylene oxide, cyclohexylmethyl 3,4-epoxy-cyclohexane carboxylate, 3,4-epoxy-6-methylcyclohexylmethyl-6-methylcyclohexyl carboxylate, bisphenol-A diglycidyl ether, tetrabromobisphenol-A diglycidyl ether, diglycidyl ester of phthalic acid, diglycidal ester of hexahydrophthalic acid, bis-epoxycyclohexyl adipate, butadiene diepoxide, tetraphenylethylene epoxide, octyl epoxy tallate and. Also, 3,4-dimethyl-1,2-epoxy cyclohexane, 3,5-dimethyl-1,2-epoxy cyclohexane, 3-methyl-5-tert butyl-1,2-epoxy cyclohexane, octadecyl 2,2-dimethyl-3,4-epoxy cyclohexane carboxylate, n-butyl 2,2-dimethyl-3,4-epoxy cyclohexane carboxylate, cyclohexyl 2-methyl-3,4-epoxy cyclohexane carboxylate, n-butyl 2-isopropyl-3,4-epoxy-5-methyl-cyclohexane carboxylate, octadecyl-3,4-epoxy cyclohexane carboxylate, 2 ethyl hexyl 3',4' epoxy cyclohexane carboxylate, 4,6 dimethyl 2,3 epoxy cyclohexyl 3',4'-epoxy cyclohexane carboxylate,diethyl 4,5-epoxy-cis-1,2 cyclohexane dicarboxylate, di-n-butyl 3-tert butyl-4,5-epoxy-cis-1,2 cyclohexane dicarboxylate. Specifically, any of the epoxy cyclohexyl compounds meet the general formula of II and the other epoxy compounds recited herein meet the general formula of I. Preferably, the epoxy compound employed in the practice of this invention is 3,4-epoxy cyclohexylmethyl 3,4-epoxy cyclohexane carboxylate.

It will thus be seen that the objects set forth above among those made apparent from the preceding description are efficiently attained and since certain changes may be made in carrying out the above process and in the composition set forth without departing from the scope of this invention, it is intended that all matters in the above description shall be interpreted as illustrative and not in a limiting sense.

What is claimed is:

1. A thermally stable aromatic polycarbonate composition comprising an aromatic polycarbonate resin having in admixture therewith an additive selected from the group consisting of (a) 0.005–0.5 weight percent of a phosphine and (b) a mixture of 0.005–0.5 weight percent of a phosphine and 0.01 to about 1.0 weight percent of an epoxy compound; said phosphine being selected from the group consisting of triaryl, trialkyl, tri(alkyla-ryl) and alkyl-aryl phosphines and mixtures thereof and said epoxy compound being selected from the group consisting of compounds represented by the formulae:

I. Derivatives of epoxy ethane represented by the following formula:

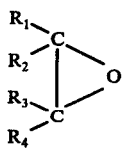

wherein $R_1$, $R_2$, $R_3$ and $R_4$ are independently selected from the group consisting of hydrogen, an alkyl radical of 1–24 carbon atoms, an aryl radical of 6–24 carbon atoms, —$CH_2OR'$, —$CH_2OCOR'$, —$CH_2OCOR''\lambda$ $COOCH_2X$, $CH_2OR''OCH_2X$ wherein $R'$ is selected from the group consisting of an alkyl radical of 1–24 carbon atoms or an aryl radical of 6 to 24 carbon atoms and wherein $R''$ is an alkylene radical of 1–24 carbon atoms and X is an oxirane ring.

II. Derivatives of epoxy cyclohexane represented by the following formula:

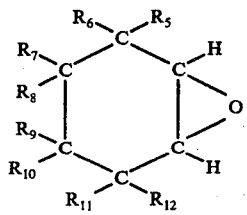

wherein $R_5$ through $R_{12}$ are independently selected from the group consisting of hydrogen, alkyl radicals of 1–24 carbon atoms, —$COOR_{13}$, —$OCOR_{13}$, —$COOR_{14}X$, —$OCOR_{14}$ —$COOX$ wherein $R_{13}$ is an alkyl radical of 1–24 carbon atoms and $R_{14}$ therein is an alkylene radical of 1–24 carbon atoms and X is an oxirane ring; provided that the number of hydrogen atoms in said epoxy compounds should be such as to minimize the volatility of the epoxy compound.

2. The composition of claim 1 wherein the phosphine is triphenyl phosphine.

3. The composition of claim 1 wherein 0.01 – 4.0 weight percent of a pigment is incorporated in the admixture.

4. The composition of claim 1 wherein the epoxy compound is 3,4-epoxy cyclohexylmethyl 3,4-epoxycyclohexane carboxylate.

* * * * *